(12) United States Patent
Palmer et al.

(10) Patent No.: US 12,048,873 B2
(45) Date of Patent: Jul. 30, 2024

(54) GAME CONTROLLER OPERABLE IN BLUETOOTH LOW ENERGY (BLE) MODE

(71) Applicant: Valve Corporation, Bellevue, WA (US)

(72) Inventors: Austin Palmer, Seattle, WA (US); Sam Lantinga, Redmond, WA (US); Nathaniel Brown, Seattle, WA (US); Corey Wharton, Black Diamond, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 18/176,928

(22) Filed: Mar. 1, 2023

(65) Prior Publication Data

US 2023/0201711 A1     Jun. 29, 2023

Related U.S. Application Data

(63) Continuation of application No. 17/301,999, filed on Apr. 21, 2021, now Pat. No. 11,623,137, which is a (Continued)

(51) Int. Cl.
*A63F 13/235* (2014.01)
*G06F 3/00* (2006.01)
(Continued)

(52) U.S. Cl.
CPC ............ *A63F 13/235* (2014.09); *G06F 3/017* (2013.01); *H04L 67/104* (2013.01); *H04W 4/80* (2018.02);
(Continued)

(58) Field of Classification Search
CPC .......... G06F 3/011; G06F 3/016; G06F 3/017; G06F 3/038; G06F 3/03543;
(Continued)

(56) References Cited

U.S. PATENT DOCUMENTS 6,570,078 B2    5/2003  Ludwig
8,754,746 B2    6/2014  Lukas et al.
(Continued)

FOREIGN PATENT DOCUMENTS

CN    106161768 A  * 11/2016
CN    207008557 U    2/2018
(Continued)

OTHER PUBLICATIONS

"Connect and troubleshoot Bluetooth on your Xbox One Wireless Controller," retrieved from https://support.xbox.com/en-US/xbox-on-windows/accessories/connect-and-troubleshoot-xbox-one-bluetooth-issues-windows-10.
(Continued)

*Primary Examiner* — Steven J Hylinski
(74) *Attorney, Agent, or Firm* — Lee & Hayes, P.C.

(57) ABSTRACT

A handheld video game controller is operable in Bluetooth Low Energy (BLE) mode to allow for sending controller input data to a target BLE device in a manner that bypasses any operating system (OS) restrictions that might otherwise be imposed on game controller input. When operating in the BLE mode, the handheld video game controller pairs (establishes a radio link) with a BLE device executing a client application used for video game streaming. During gameplay, the video game executes on a host computer and the player provides user input to the game controller to control an aspect of the video game. In response to such user input, the game controller sends controller input data to the BLE device via a radio of the game controller. The player may switch between operating the game controller in BLE mode and receiver mode using input gestures on the game controller.

20 Claims, 7 Drawing Sheets

Related U.S. Application Data continuation of application No. 16/370,656, filed on Mar. 29, 2019, now Pat. No. 11,000,759.

(51) Int. Cl.

| | | |
|---|---|---|
| *G06F 3/01* | (2006.01) | |
| *H04L 67/104* | (2022.01) | |
| *H04W 4/80* | (2018.01) | |
| *H04W 76/00* | (2018.01) | |
| *H04W 76/11* | (2018.01) | |
| *H04W 76/20* | (2018.01) | |

(52) U.S. Cl.
CPC ............ *H04W 76/00* (2013.01); *H04W 76/11* (2018.02); *H04W 76/20* (2018.02)

(58) Field of Classification Search
CPC .. G06F 3/0338; G06F 3/04883; G06F 3/0488; G06F 2203/04807; G05B 19/042; G05B 19/0426; G05B 19/409; G05B 15/02
See application file for complete search history.

(56) References Cited

U.S. PATENT DOCUMENTS

| | | | |
|---|---|---|---|
| 9,544,853 | B1 | 1/2017 | Gu et al. |
| 9,950,256 | B2 | 4/2018 | Lim |
| 10,427,035 | B2 | 10/2019 | Schmitz et al. |
| 10,441,881 | B2 | 10/2019 | Burgess et al. |
| 11,000,759 | B2 | 5/2021 | Palmer et al. |
| 2005/0170889 | A1 | 8/2005 | Lum |
| 2006/0111180 | A1 | 5/2006 | Cheng |
| 2008/0261695 | A1 | 10/2008 | Coe |
| 2009/0205878 | A1 | 8/2009 | Taylor |
| 2011/0320535 | A1 | 12/2011 | Donaldson |
| 2012/0083208 | A1 | 4/2012 | Giles et al. |
| 2014/0073252 | A1 | 3/2014 | Lee et al. |
| 2014/0149859 | A1 | 5/2014 | Van Dyken et al. |
| 2014/0154986 | A1 | 6/2014 | Lee et al. |
| 2014/0154987 | A1 | 6/2014 | Lee et al. |
| 2014/0157135 | A1 | 6/2014 | Lee et al. |
| 2014/0220894 | A1 | 8/2014 | Chen et al. |
| 2014/0267024 | A1* | 9/2014 | Keller .................. G06F 3/014 345/156 |
| 2015/0123810 | A1 | 5/2015 | Hernandez-Rosas et al. |
| 2015/0201455 | A1 | 7/2015 | Redding et al. |
| 2015/0217191 | A1 | 8/2015 | Yan |
| 2016/0030835 | A1* | 2/2016 | Argiro .................. A63F 13/428 463/31 |
| 2016/0055474 | A1 | 2/2016 | Syed |
| 2016/0302058 | A1 | 10/2016 | Mestanov et al. |
| 2016/0315982 | A1 | 10/2016 | Wallace et al. |
| 2017/0189800 | A1 | 7/2017 | Crain |
| 2017/0220104 | A1 | 8/2017 | Goslin |
| 2017/0250974 | A1 | 8/2017 | Antonyraj et al. |
| 2017/0265234 | A1 | 9/2017 | Wallington |
| 2017/0311368 | A1 | 10/2017 | Kandur Raja et al. |
| 2017/0318612 | A1 | 11/2017 | Gu et al. |
| 2017/0339524 | A1 | 11/2017 | Cho et al. |
| 2018/0083795 | A1 | 3/2018 | Zehler et al. |
| 2018/0199176 | A1 | 7/2018 | Srivatsa et al. |
| 2018/0213478 | A1 | 7/2018 | Baron et al. |
| 2018/0352583 | A1 | 12/2018 | Smith |
| 2018/0369692 | A1 | 12/2018 | Winick |
| 2018/0376528 | A1 | 12/2018 | Lee et al. |
| 2019/0098678 | A1 | 3/2019 | Von Dentz et al. |
| 2020/0082819 | A1 | 3/2020 | Kim et al. |
| 2020/0146084 | A1 | 5/2020 | Boushley et al. |
| 2020/0306625 | A1 | 10/2020 | Palmer et al. |
| 2021/0236917 | A1 | 8/2021 | Palmer et al. |

FOREIGN PATENT DOCUMENTS

| | | | |
|---|---|---|---|
| EP | 2739020 | 6/2014 | |
| EP | 2739020 A2 * | 6/2014 | ............ G06F 1/163 |
| KR | 20140112131 A | 9/2014 | |
| WO | WO-2005081565 A1 * | 9/2005 | ............ E05B 79/20 |

OTHER PUBLICATIONS

Extended European Search Report mailed Dec. 15, 2022 for European Patent Application No. 20783797.2, 7 pages.
"How to connect an Xbox One Wireless Controller to a Windows PC," retrieved from https://support.xbox.com/en-US/xbox-on-windows/accessories/connect-xbox-one-controller-to-pc.
Office Action for U.S. Appl. No. 17/301,999, mailed Aug. 3, 2022, Palmer, "Game Controller Operable in Bluetooth Low Energy (BLE) Mode", 9 pages.
Office Action for U.S. Appl. No. 16/370,656, mailed on Oct. 6, 2020, Palmer, "Game Controller Operable in Bluetooth Low Energy (BLE) Mode". 11 Pages.
The International Report on Preliminary Patentability for PCT Application No. PCT/US20/24493.
PCT Search Report and Written Opinion mailed on Jun. 19, 2020 for PCT Application No. PCT/US20/24493, 18 pages.
SlagCoin Instruction Manual for a Joystick Controller "SlagCoin Appendix—Joystick Controller" last updated Feb. 25, 2009 www.slagcoin.com/joystick.html 52 pages.
WICO Corporation Consumer Division Manual for "WICO Command Control" Trackball controller, 1982, 6 pages.
"Xbox Wireless Controller ," retrieved from https://www.xbox.com/en-US/xbox-one/accessories/controllers/xbox-wireless-controller.
Chinese Office Action mailed Jul. 1, 2023 for Chinese Patent Application No. 202080024817.6, a foreign counterpart to U.S. Pat. No. 11,000,759, 14 pages.

* cited by examiner

GAME CONTROLLER OPERABLE IN BLUETOOTH LOW ENERGY (BLE) MODE

CROSS REFERENCE TO RELATED APPLICATION

This U.S. patent application is a continuation of and claims priority to and commonly assigned U.S. patent application Ser. No. 17/301,999, entitled "GAME CONTROLLER OPERABLE IN BLUETOOTH LOW ENERGY (BLE) MODE," and filed on Apr. 21, 2021, which is a continuation of and claims priority to commonly assigned U.S. patent application Ser. No. 16/370,656, entitled "GAME CONTROLLER OPERABLE IN BLUETOOTH LOW ENERGY (BLE) MODE," and filed on Mar. 29, 2019, now issued as U.S. Pat. No. 11,000,759, the entirety of each of which is incorporated herein by reference.

BACKGROUND

In-home video game streaming allows for playing a video game on one computer (a target device) while the video game is actually executing on another computer (a host computer) elsewhere in a home environment. An example setup includes a personal computer (PC) (a host computer) located in a home office that executes the video game, captures video game data (e.g., audio and video data), and streams the video game data over the home network to a living room television (a target device). In this scenario, the player can use a handheld video game controller to play the video game from the living room couch while the video game content is rendered on the television. If the living room television does not include the appropriate receiver, a hub device might act as an intermediary that receives the video game data from the PC and provides the video game data over an audio/video interface to the living room television. The hub device may also receive controller input data from the game controller and provide the controller input data to the PC in the upstream direction. Other setups might use a Universal Serial Bus (USB) dongle as a wireless receiver, which can be plugged into a target device, such as a laptop, with a suitable USB port. The dongle would receive of the controller input data provided by the game controller, allowing for gameplay on a target device that streams the video game data from the PC over the home network. Using these and other setups, a player is able to play a video game on multiple different devices located throughout the house while the video game is actually executing on the host computer somewhere else in the environment.

Today, there is a demand to allow games to be streamed to consumer electronic devices (e.g., tablet computers, smart phones, etc.), which are ubiquitous amongst consumers. There is also a concomitant demand to allow players to switch between devices, even in the midst of a single video game session. For example, a player might want to start playing a video game on a tablet computer, and may want to subsequently switch to playing the video game on the living room television. All the while, the user might want to carry around a favorite video game controller that is usable to play video games on these various target devices.

For security reasons, or otherwise, operating system (OS) vendors place restrictions on the types of peripherals (e.g., gaming controllers) that are allowed to connect to a device running their OS. Apple's iOS is illustrative because iOS only allows gamepads that are MFi-certified to connect to iOS devices. This means that, in order to stream a video game on an iOS device, a player is unable to use a game controller that is not MFi-certified. Instead, the player is forced to use an often less-performant gamepad that is MFi-certified in order to stream the video game on the iOS device and play the game with a handheld video game controller. Other popular OS's, such as Android, may connect to certain game controllers, but the OS may not support all of the features and functionality of the game controller. For example, the OS may be unable to interpret a guide/menu button input or a back button input when these buttons are actuated on the game controller. Furthermore, plugging a USB dongle into a tablet or a smart phone with a thin profile becomes a less desirable solution due to the susceptibility of damaging the device or the dongle if the dongle is struck by an object. Some devices don't support the use of a dongle in the first place. In addition, it is easy to lose or misplace a dongle when the user has to carry the dongle around from one device to another in order to stream video games to different target devices.

In light of these considerations, today's in-home video game streaming ecosystem is restricted to a limited subset of target devices that work with most video game controllers, else a player is forced to use a less performant game controller with other target devices. The disclosure made herein is presented with respect to these and other considerations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
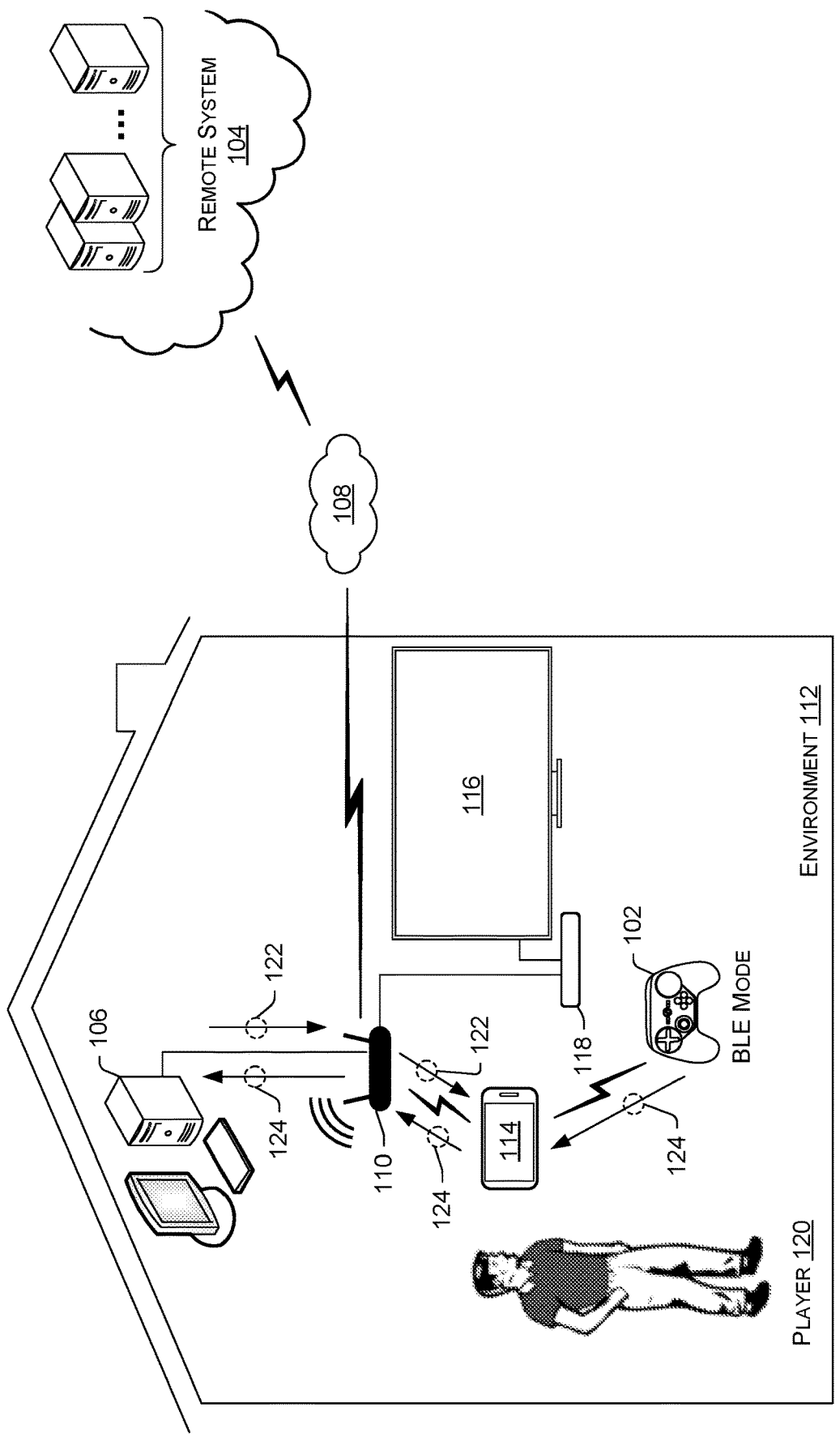
FIG. 1A is a schematic diagram illustrating an example technique of streaming a video game to a first target device when operating a game controller in Bluetooth Low Energy (BLE) mode.

Described herein are, among other things, techniques, devices, and systems, for streaming video game data to Bluetooth Low Energy (BLE) devices and for enabling players to use a BLE game controller to play video games on such BLE devices. Specifically, a handheld video game controller is operable in BLE mode, among other modes, to allow for sending controller input data to a target BLE device in a manner that bypasses any operating system (OS) restrictions that might otherwise be imposed on game controller input. Because BLE radios are ubiquitous in today's wireless consumer electronic devices, the ability to provide controller input data to a BLE device—using BLE protocol as a means of bypassing known OS restrictions on game controller input—expands the ecosystem of devices and platforms used for video game streaming. That is, BLE devices—that heretofore were not usable as target devices for video game streaming because of their OS-imposed restrictions on game controller input—are now usable as target devices for video game streaming with BLE game controllers.

A handheld video game controller, according to embodiments disclosed herein, includes a wireless radio, and logic to operate in different modes. The different modes of operation include at least a BLE mode and a receiver mode. When operating in the BLE mode, the handheld video game controller establishes a wireless connection with a BLE device executing a client application used for video game streaming. During gameplay, the video game executes on a host computer and the player provides user input to the game controller to control an aspect of the video game. In response to such user input, the game controller sends controller input data to the BLE device via the radio. In this manner, a BLE interface is usable as a side-band communication path between the BLE-capable game controller and the host computer to enable video game streaming (e.g., over a home network). The side-band communication path effectively bypasses any OS restrictions that the BLE device's OS would otherwise impose on video game controller peripherals and their corresponding controller input data.

When operating in the receiver mode, the handheld video game controller uses the radio of the game controller to establish a wireless connection with a wireless receiver that utilizes a non-BLE protocol. During gameplay, in response to user input to control an aspect of the video game, the game controller may send controller input data to the wireless receiver via the radio. This wireless receiver can be connected to, or embedded in, any target device on which the player desires to play the video game. If the wireless receiver is connected to, or embedded in, a device different from the aforementioned BLE device, switching modes on the game controller allows the player to switch between target devices so that the video game can be played at different locations within an environment (e.g., different rooms of a house). In some embodiments, the wireless receiver may be connected to, or embedded in, the same BLE device that is usable as a target device when the game controller is in BLE mode. In this latter scenario, the player can play a video game on a single BLE device, but may switch between using the game controller in BLE mode and using the game controller in the receiver mode for performance reasons or otherwise. For example, because streaming data over BLE is known to be less performant that certain other non-BLE wireless protocols, such as a low-latency WiFi protocol usable in the receiver mode, a player may switch to operating the game controller in the receiver mode to take advantage of performance gains using the receiver mode (e.g., in order to connect more game controllers to the same wireless receiver without experiencing input latency, or in order to play a more latency-dependent video game where the player must react quickly in order to perform well, etc.). Meanwhile, the player may wish to revert to operating the game controller in BLE mode if, for example, the player wants to use a different (e.g., more portable/mobile) device, such as a tablet or a smartphone, to play the video game. Switching between modes may be enabled through gestural input to the handheld video game controller (e.g., using a multi-button gesture involving a particular combination of buttons).

Also disclosed herein is a client application (sometimes referred to herein as a "client app") that may be downloaded to a BLE device and executed thereon to enable video game streaming from a host computer to the BLE device, and to enable passing of controller input data from the handheld video game controller to the host computer via the BLE device. That is, the client application supports the use of a handheld video game controller in BLE mode to provide full access to the game controller's features. This setup does not require the use of a dongle or another external wireless receiver, which may provide benefits, such as not requiring the player to carry a dongle around with them, which can be easily lost or damaged. The client app that is executable on a BLE device may include custom BLE characteristics that configure the BLE device to receive controller input data over a radio from a handheld video game controller operating in BLE mode. A user can connect the BLE device to a local area network (LAN) so that the BLE device can forward controller input data it receives from the game controller to a host computer that is executing the video game.

The host computer executing the video game may be collocated in an environment with the BLE device and the handheld video game controller, or the host computer may be remotely located at a geographically remote location (e.g., a server computer located "in the cloud"). When the host computer is local to the environment where the BLE device and the game controller are located, the host computer may be connected to the same LAN to which the BLE device is connected. The host computer may use a video game client to execute the video game during a video game session. During gameplay, the host computer receives controller input data from an intermediary device (e.g., from the BLE device connected to the game controller operating in BLE mode), and the video game client of the host computer may convert the controller input data into video game input data that is subsequently processed by the video game executing on the host computer. The video game client may hook the input library specific to the video game it is executing in order to convert the controller input data to something usable by the video game. Upon rendering each frame during gameplay, the video game client captures video game data (e.g., audio and video data), and the host computer sends the video game data to the target device, such as the BLE device, over the LAN. The BLE device outputs the audio and video data (e.g., via speakers and a display) for consumption by the player during gameplay.

The techniques and systems disclosed herein allow a player to utilize a BLE device as a target device for video game streaming, regardless of the type of OS running on the BLE device. This is more flexible and versatile than having to use an OS-authorized gamepad with a BLE device, which limits the compatible game controllers to a much smaller set of game controllers. Because the disclosed techniques and systems allow for using virtually any type of BLE-capable game controller to play a video game that is streamed to a connected BLE device, a player of the video game can enjoy using a favorite game controller, so long as the game controller includes a BLE-capable radio and the logic described herein for sending controller input data to a connected BLE device over a BLE interface. Furthermore, the ability of the player to switch between operating the handheld video game controller in different modes—namely, between a BLE mode and a receiver mode—allows the user to play a video game on any desired target device within an environment, and to switch between these devices, even during a single game session. This opens the door to streaming games on BLE devices that does not have a USB port to receive a dongle, which increases the flexibility and convenience of video game streaming. The retained ability to operate the handheld video game controller in receiver mode (e.g., by sending controller input data over the radio to a wireless receiver that utilizes a non-BLE protocol) provides players with lower-latency connection options, as compared to a less-performant BLE connection, so that players can, for instance, connect more game controllers or play an input latency-dependent video game.

Figure 1B:
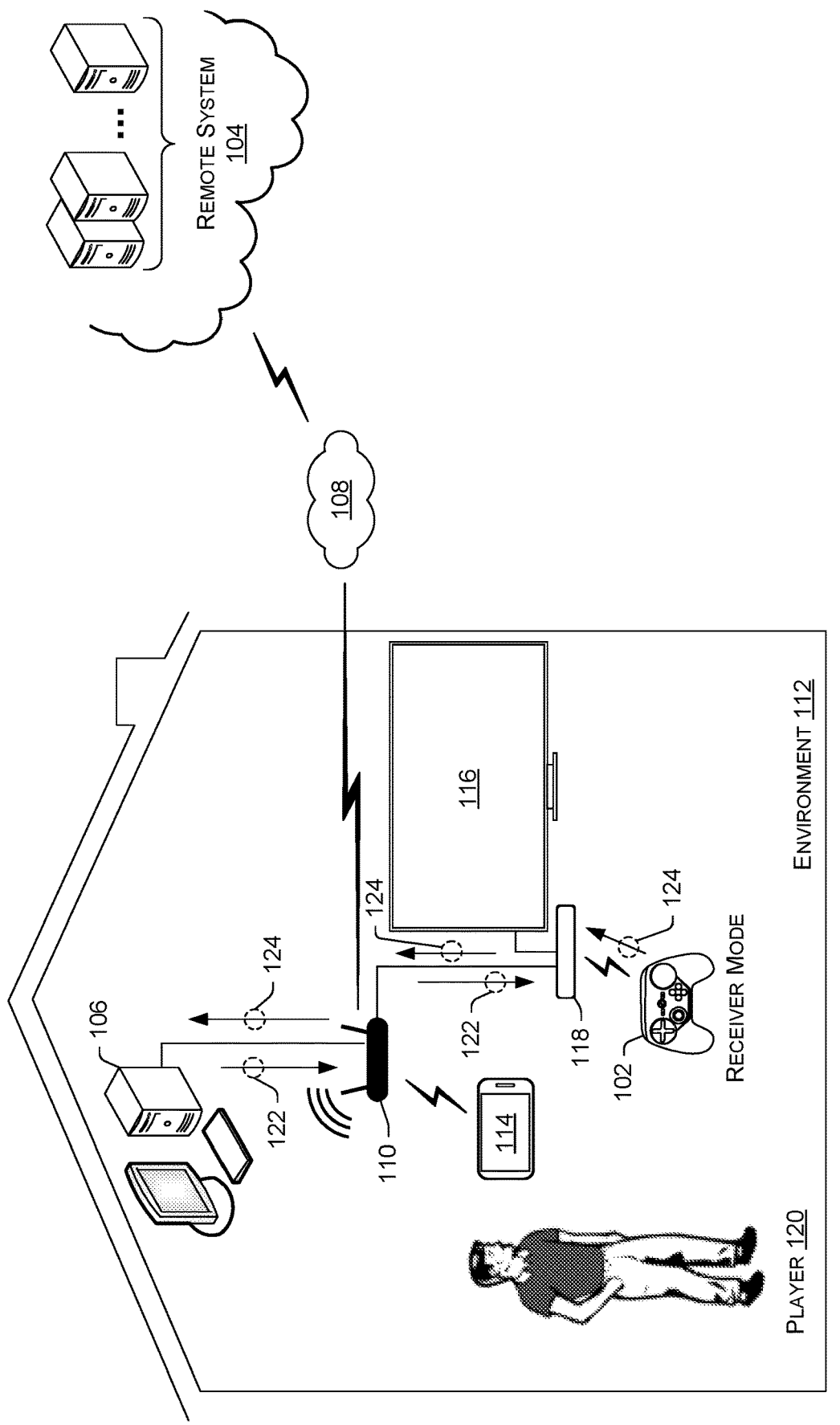
FIG. 1B is a schematic diagram illustrating an example technique of streaming a video game to a second target device when operating a game controller in a receiver mode.

FIG. 1A is a schematic diagram illustrating an example technique of streaming a video game to a first target device when operating a game controller in Bluetooth Low Energy (BLE) mode. FIG. 1B is a schematic diagram illustrating an example technique of streaming a video game to a second target device when operating a game controller in a receiver mode. Thus, FIGS. 1A and 1B are illustrated to contrast the different operating modes of a handheld video game controller 102. FIGS. 1A and 1B include a remote system 104 (sometimes referred to as a "remote computing system" 104). The remote system 104 may act as, or have access to, a platform to distribute (e.g., download) programs (and content) to client machines, such as the client machine 106 shown in FIGS. 1A and 1B. These programs (and content) may include video games (or video game programs). The client machine 106 may communicate with the remote system 104 over a computer network 108 via a communications interface(s) of the client machine 106. The computer network 108 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. As such, the client machine 106 send/receive data to/from the remote system 104 via a wireless access point (WAP) 110 that is part of a local area network (LAN) using any suitable communications protocol. The remote system 104 may, in some instances be part of a network-accessible computing platform that is maintained and accessible via the computer network 108. Network-accessible computing platforms such as this may be referred to using terms such as "on-demand computing", "software as a service (SaaS)", "platform computing", "network-accessible platform", "cloud services", "data centers", and so forth.

The client machine 106 may represent a personal computer (PC), although the client machine is not limited to a configuration of a PC. That is, the client machine 106 can be implemented as any suitable type of computing device configured to execute a video game, including, without limitation, a PC, a desktop computer, a laptop computer, a mobile phone (e.g., a smart phone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, and/or any similar computing device. The client machine 106 may be located within an environment 112 along with one or more additional devices. The environment 112 in which the client machine 106 is located may be a home or other premises, an automobile, or any similar environment. Such an environment may include, for example, the aforementioned handheld video game controller 102 (sometimes referred to herein as a "game controller" 102, or "handheld controller" 102), the WAP 110, a BLE device 114, a television 116, and a wireless receiver 118, among other possible devices, such as Internet of Things (IoT) devices, other consumer electronic devices, etc.

Figure 2:
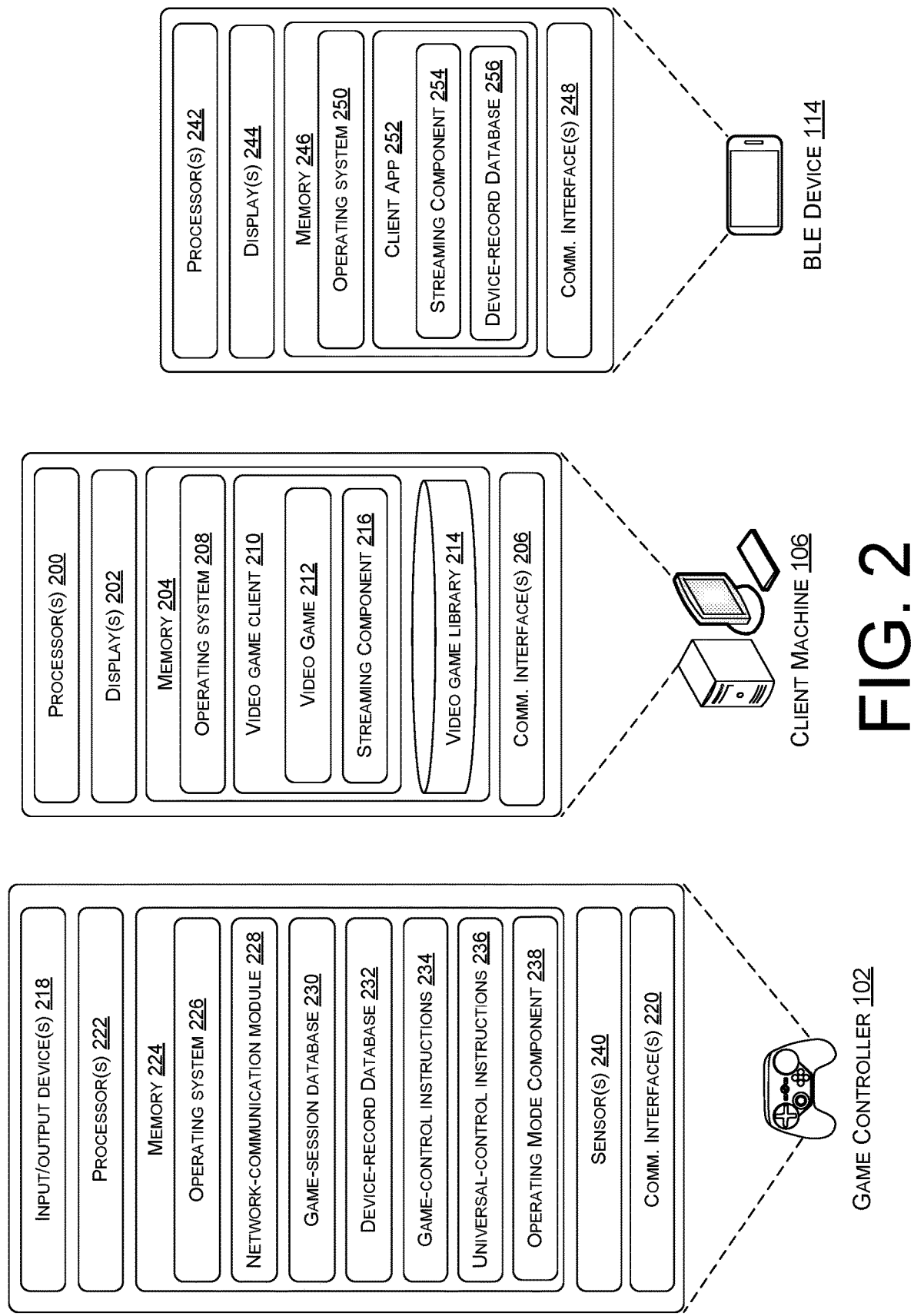
FIG. 2 is a diagram illustrating components of an example client machine usable as a host computer, components of an example game controller, and components of an example BLE device.

In general, the client machine 106 shown in FIGS. 1A and 1B may represent a computing device that can be utilized by a player 120 to execute programs (e.g., video games) and other software thereon as a "host computer." That is, a "host computer," as used herein, means a computer that is executing a video game, whether the player 120 is playing the video game on the host computer, or whether the host computer is streaming video game data to a target device. The terms "user 120," "player 120," and/or "gamer 120" may be used interchangeably herein to denote a user who is using a computing device(s) to play a video game. Referring briefly to FIG. 2, the client machine 106 includes, among other components, one or more processors 200—such as a central processing unit(s) (CPU(s)) and a graphics processing unit(s) (GPU(s)), a display(s) 202, memory 204 (or non-transitory computer-readable media 204), and a communications interface(s) 206. Although the example client machine 106 of FIG. 2 suggests that the client machine 106 includes a display 202, the client machine 106 may in fact omit a display, and/or may be coupled to a peripheral display.

The memory 204 (or non-transitory computer-readable media 204) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 204 may be implemented as computer-readable storage media ("CRSM"), which may be any available physical media accessible by the processor(s) 200 to execute instructions stored on the memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 200.

The memory 204 may include an operating system module 208 configured to manage hardware within and coupled to the client machine 106 for the benefit of other modules. The client machine 106 may also have a video game client 210 installed in the memory 204. The video game client 210 may represent an executable client application that is configured to launch and execute programs, such as video games (or video game programs). In other words, the video game client 210 may include gaming software that is usable to play video games on the client machine 106. With the video game client 210 installed, the client machine 106 may then have the ability to receive (e.g., download, stream, etc.) video games from the remote system 104 over the computer network 108, and to execute the video games via the video game client 210. Any type of content-distribution model can be utilized for this purpose, such as a direct purchase model where video games are individually purchasable for download and execution on a client machine 106, a subscription-based model, a content-distribution model where video games are rented or leased for a period of time, and so on. Accordingly, the client machine 106 may include one or more video games, such as the video game 212, within a video game library 214. These video games may be retrieved and executed by loading the video game client 210. In an example, the player 120 may choose to play one of multiple video games they have purchased and downloaded to the video game library 214 by loading the video game client 210 and selecting a video game 212 to start execution of the video game 212. The video game client 210 may allow users, such as the player 120, to login to a video game service using credentials (e.g., a user account, password, etc.).

The video game client 210 is also shown as including a streaming component 216 configured to stream video games to target devices, and to receive and process controller input data generated by game controllers, such as the game controller 102. This may occur when the player 120 is playing a video game 212 streamed from the client machine 106 acting as a host computer to any target device in the environment 112. In some embodiments, a user, such as the player 120, provides user input to the client machine 106 to invoke the streaming component 216 when the player 120 wants to play a video game 212 on a target device other than the client machine 106. It is to be appreciated that the same or similar components as shown with respect to the client machine 106 (and their associated functionality) can be implemented at (or by) the remote system 104 to enable streaming of video game data from the remote system 104 directly to a networked device in the environment 112, without executing a video game locally with respect to the environment 112. That is, the remote system 104, in some embodiments, can act as a host computer that is executing the video game and streaming video game data to a target device over the computer network 108.

The game controller 102, as shown in FIG. 2, may one or more input/output (I/O) devices 218, such as the controls (e.g., joysticks, trackpads, triggers, depressible buttons, etc.), potentially any other type of input or output devices. For example, the I/O devices 218 may include one or more microphones to receive audio input, such as user voice input. In some implementations, one or more cameras or other types of sensors may function as input devices to receive gestural input, such as motion of the handheld controller 102. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the handheld controller 102 may additionally or alternatively comprise any other type of output device. In some instances, output by the one or more output devices may be based on input received by one or more of the input devices. For example, actuation of a control may result in the output of a haptic response by a vibrator located adjacent (e.g., underneath) the control or at any other location.

In addition, the handheld controller 102 may include one or more communication interfaces 220 to facilitate a wireless connection to a network and/or to another device. The communication interface(s) 220 may implement multiple types of wireless or radio technologies to support operation of the game controller 102 in different modes. For example, the communication interface(s) 220 may implement a radio that is configured to operate in the BLE mode or the receiver mode, as described herein, and to switch between the two modes of operation. That is, a single radio may execute code that causes the radio to operate in the BLE mode or in the receiver mode, as described herein. It is to be appreciated, however, that the communication interface(s) 220 may implement multiple radios, such as a Wi-Fi radio, BLE radio, a cellular radio, and so on. In some embodiments, separate radios may be utilized to operate in the respective modes, such as utilizing a WiFi radio to operate in the receiver mode, and utilizing a BLE radio to operate in the BLE mode. It is to be appreciated that the handheld controller 102 may further include physical ports to facilitate a wired connection to a network, a connected peripheral device, or a plug-in network device that communicates with other wireless networks.

In the illustrated implementation, the handheld controller further includes one or more processors 222 and memory 224 (or computer-readable media 224). In some implementations, the processors(s) 222 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 222 may possess its own local memory, which also may store program modules, program data, and/or one or more operating systems.

The memory 224 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 224 may be implemented as computer-readable storage media ("CRSM"), which may be any available physical media accessible by the processor(s) 222 to execute instructions stored on the memory 224. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 222.

Several modules such as instruction, datastores, and so forth may be stored within the memory 224 and configured to execute on the processor(s) 222. A few example functional modules are shown as stored in the memory 224 and executed on the processor(s) 222, although the same functionality may alternatively be implemented in hardware, firmware, or as a system on a chip (SOC).

An operating system module 226 may be configured to manage hardware within and coupled to the handheld controller 102 for the benefit of other modules. In addition, the memory 224 may store a network-communications module 228 that enables the handheld controller 102 to communicate, via the communication interfaces 220, with one or more other devices, such as the BLE device 114 or the wireless receiver 118 introduced in FIGS. 1A and 1B, a game console, etc. The memory 224 may further include a game-session database 230 to store data associated with a game (or other application) executing on the handheld controller or on a computing device to which the handheld controller 102 couples. The memory 224 may also include a device-record database 232 that stores data associated with devices to which the handheld controller 102 couples. This device-record database 232 may retain a history of previously connected devices ordered by recency of the connection so that the game controller 102 can determine a last known device to which the game controller 102 was last connected, at any given instance. The memory 224 may further store game-control instructions 234 that configure the handheld controller 102 to function as a gaming controller by sending controller input data to another device that is game-related, and universal-control instructions 236 that configure the handheld controller 102 to function as a controller of other, non-gaming devices.

The memory 224 may further store an operating mode component 238 configured to determine and implement the operating mode of the game controller 102 based on user input (e.g., based on gestures provided by the player 120). For example, as will be described in more detail below, the player 120 may provide a first gesture, such as by pressing a first combination of multiple buttons, to place the handheld controller 102 into BLE mode, and may provide a second gesture, such as by pressing a second combination of multiple buttons, to place the handheld controller 102 into receiver mode. The operating mode component 238 may also store, in local memory 224 of the game controller 102, the last mode that was used. In this manner, upon startup of the game controller 102, if a particular mode is not invoked by the player 120 via a gesture, the operating mode component 238 may determine the last mode in which the game controller 102 operated, and may operate in that mode at startup.

The game controller 102 may further include one or more sensors 240 including, without limitation, a touch sensor(s) (e.g., a capacitive touch sensor(s), a resistive touch sensor(s), an infrared touch sensor(s), a touch sensor(s) that utilizes acoustic soundwaves to detect a proximity of a finger, etc.), a force sensing resistor(s) (FSRs), a motion sensor(s) (e.g., an inertial measurement unit(s) (IMUs) including one or more gyroscopes, and/or accelerometers, and/or magnetometers, and/or compasses, a camera(s) or 3D sensor(s) configured used for feature tracking, etc.).

The BLE device 114, as shown in FIG. 2, may include similar components to the client machine 106, such as a processor(s) 242, a display(s) 244, memory 246, and a communications interface(s) 248, which may be similar to the processor(s) 200, display(s) 202, memory 204, and communications interface(s) 206 described with reference to the client machine 206. The communications interface(s) 248 of the BLE device 114 (as its name implies) includes a radio to receive controller input data from the game controller 102 over a BLE interface. The radio may also be configured to send/receive data to/from the WAP 110 in the environment over WiFi, and/or the communications interface(s) 248 may include a dedicated WiFi radio to send/receive data to/from the WAP 110 in the environment.

The memory 246 of the BLE device 114 may include an operating system 250 configured to manage hardware within and coupled to the BLE device 114 for the benefit of other modules. The BLE device 114 may have also downloaded a client application 252 (or "client app" 252) and stored the client app 252 in the memory 246. The client app 252 includes a streaming component 254 that configures the BLE device 114 to function as a target device for video game streaming. In this manner, the BLE device 114 receives video game data streamed from a host computer (e.g., the client machine 106) that is executing a video game 212 and outputs the audio and video data via an output device(s) (e.g., display(s) 244 and speaker(s)) of the BLE device 114. The BLE device 114, using the client app 252, also functions as a receiver of controller input data sent by the game controller 102 during gameplay over a radio. The client app 252 may further maintain a device-record database 256 that stores data associated with devices to which the BLE device 114 couples. This may allow the BLE device 114 to retain security and/or authentication credentials to pair with previously connected devices, such as the game controller 102.

To illustrate how the game controller 102 may operate in BLE mode to enable video game streaming to the BLE device 114, reference is again made to FIG. 1A. Initially, the player 120 connects the client machine 106 and the BLE device 114 to a home network (e.g., by connecting these devices to the WAP 110). The player 120 also pairs the game controller 102 with the BLE device 114 executing the client app 252. This pairing operation may be accomplished by the player 120 providing user input to the game controller 102 that puts the game controller 102 into BLE pairing mode. The client app 252 executing on the BLE device 114 may include custom BLE characteristics that configure the BLE device 114 to receive controller input data over a radio from the game controller 102 operating in BLE mode. Data used by profiles and services in BLE are referred to as "characteristics." Profiles and applications thus interface with a generic attribute profile (GATT) layer in the BLE protocol stack for communication of characteristics. A BLE "profile" is a specification regarding an aspect of Bluetooth communication. A profile defines configurations and functions that enable a service provided using wireless communication. In some embodiments, the client app 252 may provide a notification in response to the game controller 102 entering BLE pairing mode, indicating to the player 120 that a game controller 102 wants to connect to the BLE device 114. The player 120 may provide user input to the BLE device accepting this connection request to pair the two devices over a BLE interface.

The game controller 102, via the operating mode component 238, may operate in BLE mode by default in response to the player 120 pairing the game controller 102 over BLE with a BLE device 114. Alternatively, the player 120 may provide user input to the game controller 102 that corresponds to a command to operate the game controller 102 in BLE mode. In any case, the game controller 102 may establish a radio link with the BLE device 114 executing the client app 252 using a radio of the game controller 102.

The player 120 may have also started a video game session for a video game 212 executing on the video game client 210 of the client machine 106. In a case where there are multiple client machines running the video game client 210, the client app 252 may provide an additional notification to the player 120 asking the player 120 which client machine he/she wants to connect to as a host computer for streaming the video game 212. The player 120 may select a particular client machine, such as the client machine 106, and the streaming connections are setup at this point. Establishing connections in this manner may include authentication or authorization procedures (e.g., digital handshaking, credential verification, etc.).

During gameplay, for each frame, the video game client 210 executing on the client machine 106 (the host computer) captures video game data 122 and sends the video game data over the LAN (e.g., via the WAN 110) to the BLE device 114. This may involve the video game client 210 of the host computer capturing the state of the video game 212 window, encoding the video and audio data into bits, transmitting the encoded bits to the BLE device 114, and the client app 252 executing on the BLE device 114 decodes the bits to render the video game content of the frame and output the audio via its speakers (or via headphones connected to the BLE device 114). The encoding of video data may include H.264 video encoding, and sending the encoded data using a low-latency network protocol. In an example, the client machine 106 may be connected to the WAP 110 via a wired (e.g., Ethernet) connection for low latency, and the WAP 110 may send the encoded data wirelessly to the BLE device 114 such that the BLE device 114 receives the encoded data via its radio using WiFi protocol. Streaming resolution and bitrate may be configurable by the player 120. Over a 5 gigahertz (GHz) network, for example, a resolution of 1080p or higher (e.g., 4K) at a frame rate of 60 frames per second (FPS) may be utilized.

The player 120 consumes the video game content on the BLE device 114 acting as a target device. Notably, the BLE device 114 is not executing the video game 212; the host computer—in this case, the client machine 106—is the device executing the video game 212. The BLE device 114 effectively acts as a thin client that merely receives video game data 122 (e.g., audio and video data) that is processed (e.g., decoded) and output via the appropriate output devices of the BLE device 114 for consumption by the player 120. During gameplay, the player 120 uses the game controller 102 (which is connected to the BLE device 114 when the game controller is operating in BLE mode) to provide video game input. Accordingly, in response to user input detected by the game controller 102 for controlling an aspect of the video game 212, the game controller 102 sends controller input data 124 to the BLE device 114 via the radio of the game controller 102. The client app 252 executing on the BLE device 114 receives the controller input data 124 and causes the BLE device 114 to forward the controller input data 124 to the host computer (e.g., the client machine 106) over the LAN (e.g., via the WAP 110). The manner in which the controller input data 124 is routed over BLE to the client app 252 executing on the BLE device 114 effectively bypasses any OS restrictions on game controller input so that these OS restrictions do not inhibit the ability of the player 120 to stream the video game 212 on the BLE device 114 and/or to use the game controller 102 as the gamepad for playing the video game 212.

In response to receiving the controller input data 124, the video game client 210 executing on the client machine 106 may determine, based on the video game 212 that is currently executing, and based on the player's 120 preferences, how to convert the received controller input data 124 into video game input that the video game 212 (i.e., the video game code) is able to process. By default, the game controller 102 (and/or its controller input data) may "show up" as a mouse and keyboard regardless of its current mode of operation. Considering that the client machine 106, in a typical case, utilizes a mouse and keyboard as input devices, this may be the most straightforward way of providing controller input data to the host computer (e.g., the client machine 106) executing the video game 212. In some embodiments, the game controller 102 may send the raw state of the game controller 102 to the client machine 106 via the BLE device 114 and the LAN, and the video game client 210 may interpret the raw state of the game controller 102 and remap it into appropriate video game input that can be injected into the video game 212 code. In some embodiments, video game developers may utilize an application programming interface (API) that allows them to specify game controller configurations that remap (or otherwise convert) controller input data 124 from various types of controllers into suitable video game input for their video game. The video game client 210 may also translate between different types of game controllers, such as controllers on the market from various game controller makers. In some embodiments, a series of abstractions are used to take controller input data 124 and transparently convert that data 124 into packets that are sent over the LAN as if those packets were received from a mouse and keyboard of the client machine 106. In this manner, the remote nature of the game controller 102 with respect to the host computer that is executing the video game 212 is kept transparent. In some embodiments, the video game client 210 may hook the input library (or input libraries) of the video game 212 that is executing on the host computer to determine how to convert controller input data 124 into data that is usable by the video game 212. This allows the video game client 210 to intercept function calls from the video game 212 code to read the game controller state, and to return a controller state that the video game 212 is expecting to see, which may involve remapping the state of the game controller 102 to a different type of game controller state.

After converting the controller input data 124 into video game input, the video game input is injected into the video game 212 code to control an aspect of the video game 212, which causes the next frame to incorporate the controlled aspect of the video game, and this is again, captured and streamed to the target device, which, in this case, is the BLE device 114. In this manner, video game streaming continues by passing video game data 122 downstream to the BLE device 114, and passing controller input data 124 upstream to the client machine 106, as described herein.

At any time, the player 120 may decide to switch operating modes of the game controller 102. This may be done for various reasons including, without limitation, to play the video game 212 on a different target device, such as the television 116, or to enable a different wireless protocol that may be lower latency than BLE. FIG. 1B illustrates the scenario where the user has switched to operating the game controller 102 in the receiver mode (sometimes referred to as "non-BLE mode", "WiFi mode", or "dongle mode"). In the example of FIG. 1B, when the game controller 102 operates in the receiver mode, a wireless receiver 118 is used as the conduit through which the controller input data 124 is passed upstream to the host computer, and through which the video game data 122 is passed downstream to the target device. Thus, the wireless receiver 118 may, in some embodiments, act more like a hub that serves as a place of convergence where data arrives from one or more devices, and from which data is sent to one or more devices.

If the wireless receiver 118 has not previously been connected to the game controller 102, the player 120 may initiate a pairing operation to pair the game controller 102 with the wireless receiver 118. The player 120 may provide user input to the game controller 102 to place it in wireless receiver pairing mode, and the player 120 may be prompted to enter a validation code to complete the connection between the game controller 102 and the wireless receiver 118. For example, if the wireless receiver 118 is connected to the television 116 over an audio/video interface, when the television 116 is toggled to the appropriate input, the wireless receiver 118 may present a notification on the screen of the television 116 with a validation code to complete the setup.

The game controller 102, via the operating mode component 238, may operate in receiver mode by default in response to the player 120 pairing the game controller 102 over the radio with the wireless receiver 118 that utilizes a non-BLE protocol (e.g., WiFi). Alternatively, the player 120 may provide user input to the game controller 102 that corresponds to a command to operate the game controller 102 in receiver mode. In the case of switching between operating modes when the respective devices are already known to the game controller 102, additional pairing operations need not occur. Instead, when user input corresponding to a command to operate the game controller 102 in the receiver mode is detected, the game controller 102 may consult its device-record database 232 to determine the last known wireless receiver to which the game controller 102 was last connected before receiving the user input to place the controller into receiver mode. This works similarly in the opposite direction as well (e.g., consulting the device-record database 232 to determine the last known BLE device when switching into BLE mode). In any case, as shown in FIG. 1B, the game controller 102 may establish a radio link with the wireless receiver 118 using the radio of the game controller 102 (e.g., over WiFi), and the passing of data is similar to the example of operating the game controller in BLE mode, except that the controller input data 124 is passed to the host computer via the wireless receiver 118 instead of the BLE device 114. As mentioned, the receiver mode may utilize a different wireless communication protocol to pass the controller input data 124 from the game controller 102 to the wireless receiver 118, as compared to operating the game controller 102 in the BLE mode. This non-BLE communication protocol may, in some embodiments, represent an Enhanced ShockBurst (ESB)-based protocol that operates in the 2.4 GHz spectrum.

Thus, as depicted in FIGS. 1A and 1B, the disclosed handheld video game controller 102 is configured to operate in multiple different modes that utilize respective wireless protocols that are different from each other. BLE mode may be the mode that is less performant, but that provides greater flexibility in terms of the types of devices that can be used as target devices for streaming a video game 212 from a host computer, such as the client machine 106. This is at least partly due to the fact that the receiver mode may not be usable with some BLE devices due to OS restrictions on game controller input and/or the fact that these devices do not support a connection with a peripheral wireless receiver, such as the wireless receiver 118. The ability of the game controller 102 to switch into the receiver mode is useful in situations where the more performant wireless protocol used in the receiver mode allows the player 120 to connect more game controllers 102 to the wireless receiver 118, as compared to a number of game controllers that can connect to the BLE device 114 without introducing noticeable input latency. For instance, in BLE mode, the operating system 208 of the client machine 106 may utilize an update rate (an interval for reading controller input data 124) of 10 milliseconds for the game controller 102, and, if the player 120 tries to connect a second game controller to the BLE device 114 to play with a friend, the operating system 208 may allocate an update rate of 22 milliseconds for the additional game controller because it does not have enough radio bandwidth in BLE mode to accommodate the additional game controller at an update rate that is any faster. This might cause a situation where one of two players competing in a video game experiences input latency, inhibiting that players gameplay performance. To address this inherent limitation of the BLE protocol, the players may switch their game controllers to the receiver mode to stream the video game via the wireless receiver 118, which may offer a lower latency connection with suitable bandwidth to accommodate the multiple game controllers.

As noted elsewhere herein, the wireless receiver 118 may be implemented as a dongle (e.g., a USB dongle) that plugs into a corresponding port on a target device. In some cases, the BLE device 114 may include such a port, which means that the player 120 (or multiple players) can switch between wireless protocols while playing the video game on the same target device; namely, the BLE device 114. That is, the player 120 may start playing the video game on the BLE device 114 while operating the game controller 102 in BLE mode, and then switch to operating the game controller 102 in receiver mode. Upon switching modes, if a wireless receiver is connected to, or embedded in, the BLE device 114, the video game data 122 continues to be streamed from the host computer to the BLE device 114, but the controller input data 124 is received over a non-BLE protocol (e.g., WiFi) via the wireless receiver 118 connected to, or embedded in, the BLE device 114, instead of the controller input data 124 being received over a BLE protocol via the radio of the BLE device 114.

Figure 3:
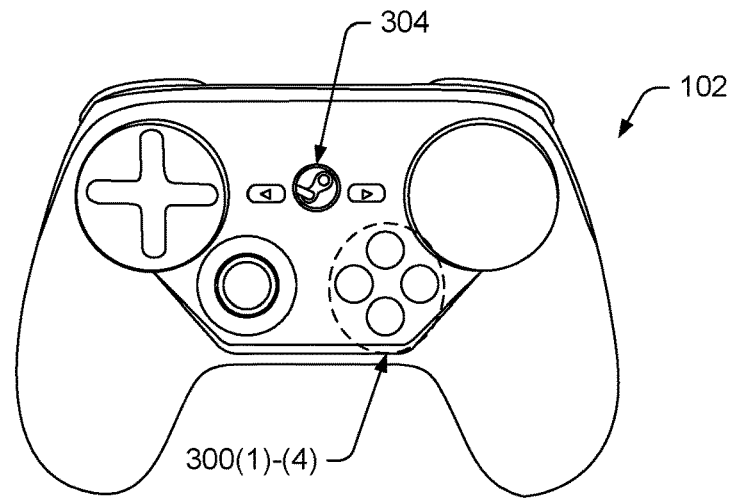
FIG. 3 is a diagram illustrating example gestures that can be provided by a user of a game controller to operate the game controller in different modes including at least a BLE mode and a receiver mode.
Figure 3:
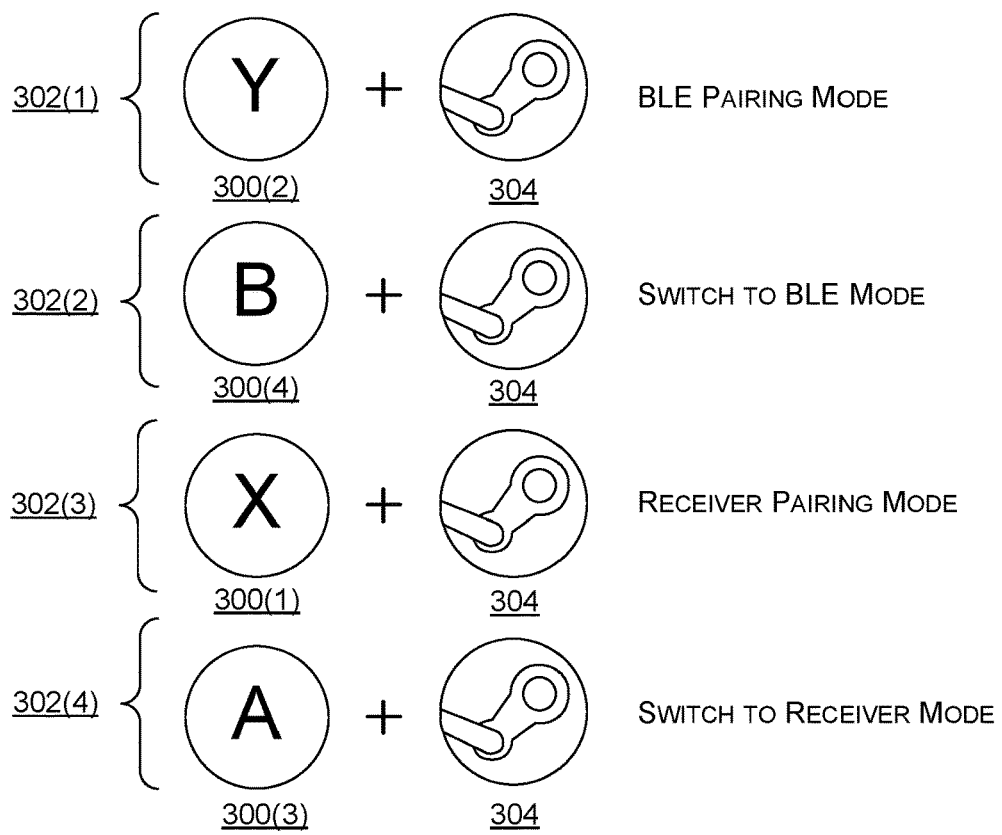

FIG. 3 is a diagram illustrating example gestures that can be provided by a user of a game controller to operate the game controller in different modes including at least a BLE mode and a receiver mode. The example game controller 102 may include depressible buttons 300(1)-(4) on a front side of the game controller 102, including an X button 300(1), a Y button 300(2), an A button 300(3), and a B button 300(4). The player 120 may provide user input comprising gestures 302(1)-(4), or different gestures. The gestures 302(1)-(4) represent multi-button gestures involving particular combinations of multiple ones of the depressible buttons 300 and a guide button 304 (sometimes referred to as the "Steam® button" 304 or "menu button" 304). For example, the player 120 may provide a first gesture 302(1) (a first multi-button gesture 302(1)) by pressing a first combination of multiple buttons (e.g., the Y button 300(2) and the guide button 304) to place the handheld controller 102 into BLE pairing mode. The player 120 may provide this first gesture 302(1) if the game controller 102 has not already been paired with the BLE device 114 and if he/she wants to stream a video game 212 to the BLE device 114 and operate the game controller 102 in BLE mode to play the video game 212.

The player 120 may provide a second gesture 302(2) (a second multi-button gesture 302(2)) by pressing a second combination of multiple buttons (e.g., the B button 300(4) and the guide button 304) to place the handheld controller 102 into BLE mode. The player 120 may provide this second gesture 302(2) at the start of a game session if the game controller 102 had, at an earlier time, been paired with a BLE device, such as the BLE device 114. In a different scenario, such as when the player 120 is playing a video game in receiver mode, the player 120 may provide the second gesture 302(2) to switch from operating the game controller 102 in receiver mode to operating the game controller 102 in BLE mode, perhaps in the middle of a game session. In yet a different scenario, such as when the player 120 is playing a video game in BLE mode, the player 120 may provide the second gesture 302(2) to switch from a first BLE device (e.g., the BLE device 114) to a second BLE device in the environment 112. For example, the device-record database 232 of the game controller 102 may be used to lookup a different BLE device known to the game controller 102 to which the game controller 102 has connected in the past. In some embodiments, particular gestures can be used to invoke different BLE devices in the device-record database 232. In this case, the player 120 may provide one gesture (e.g., the B button 300(4) and the guide button 304) to connect to the most recently used BLE device in the device-record database 232, and another gesture (e.g., a start button and the guide button 304) to connect to a next recently used BLE device in the device-record database 232. The player 120 may have to recall these gestures in order to avoid having to toggle through devices to get to the desired BLE device.

The player 120 may provide a third gesture 302(3) (a third multi-button gesture 302(3)) by pressing a third combination of multiple buttons (e.g., the X button 300(1) and the guide button 304) to place the handheld controller 102 into receiver pairing mode. The player 120 may provide this third gesture 302(3) if the game controller 102 has not already been paired with the wireless receiver 118 and if he/she wants to stream a video game 212 to the wireless receiver 118 that is connected to a target device in the environment 112, and to operate the game controller 102 in receiver mode to play the video game 212.

The player 120 may provide a fourth gesture 302(4) (a fourth multi-button gesture 302(4)) by pressing a fourth combination of multiple buttons (e.g., the A button 300(3) and the guide button 304) to place the handheld controller 102 into receiver mode. The player 120 may provide this fourth gesture 302(4) at the start of a game session if the game controller 102 had, at an earlier time, been paired with a wireless receiver, such as the wireless receiver 118. In a different scenario, such as when the player 120 is playing a video game in BLE mode, the player 120 may provide the fourth gesture 302(4) to switch from operating the game controller 102 in BLE mode to operating the game controller 102 in receiver mode, perhaps in the middle of a game session. In yet a different scenario, such as when the player 120 is playing a video game in receiver mode, the player 120 may provide the fourth gesture 302(4) to switch from a first wireless receiver (e.g., the wireless receiver 118) to a second wireless receiver in the environment 112. For example, the device-record database 232 of the game controller 102 may be used to lookup a different wireless receiver known to the game controller 102 to which the game controller 102 has connected in the past. In some embodiments, particular gestures can be used to invoke different wireless receivers in the device-record database 232. In this case, the player 120 may provide one gesture (e.g., the A button 300(3) and the guide button 304) to connect to the most recently used wireless receiver in the device-record database 232, and another gesture (e.g., a back button and the guide button 304) to connect to a next recently used wireless receiver in the device-record database 232. The player 120 may have to recall these gestures in order to avoid having to toggle through devices to get to the desired wireless receiver.

In some embodiments, the player 120 may set preferences to connect to preferred devices (e.g., preferred BLE devices and/or preferred wireless receivers) at start up, and the player 120 may toggle between devices using the gestures 302(2) or 302(4), depending on the current mode of operation (i.e., BLE mode or receiver mode). Additionally, or alternatively, as mentioned previously, the device-record database 232 may be used to determine a last known device (e.g., a last known BLE device and/or last known wireless receiver) to which the game controller 102 was last connected before a gesture 302 was received. At startup, the device-record database 232 may keep a history of connected devices in persistent (non-volatile) memory to connect to the last known device at startup. The device-record database 232 may maintain an address of the previously connected devices, as well as security and/or authentication information (e.g., keys, passcodes, credentials, etc.) that are used to establish a radio link with these devices after previously disconnecting therefrom. Additionally, or alternatively, the game controller's 102 operating mode component 238 may persist, in local memory 224, the last operating mode (e.g., BLE mode or receiver mode) that was used, and may revert to the last used operating mode at startup when the player 120 does not provide one of the gestures 302. In some embodiments, whenever the player 120 downloads the client app 252 to a new BLE device, the player 120 may be notified (e.g., via the client app 252) of the availability to connect their game controller 102 to the BLE device (e.g., by providing the first gesture 302(1) to the game controller 102). Likewise, whenever the player 120 connects a wireless receiver 118 to a BLE device running the client app 252, the player 120 may be notified (e.g., via the client app 252) of the availability to connect their game controller 102 to the wireless receiver (e.g., by providing the third gesture 302(3) to the game controller 102).

Although particular multi-button gestures 302 are shown in FIG. 3, these are merely example gestures, and other gestures can be implemented to provide similar functionality. For example, touch sensors associated with particular controls, such as top bumper controls, may detect swipe gestures. In this manner, a swipe in one direction (e.g., left-to-right) or on a first control (e.g., the left bumper) may correspond to a command to operate the game controller 102 in BLE mode, while a swipe in an opposite direction (e.g., right-to-left) or on a second control (e.g., the right bumper) may correspond to a command to operate the game controller 102 in receiver mode. Other gestures are contemplated as possibilities for this type of functionality, including voice gestures detected by a microphone of the game controller 102. For example, the player 120 may utter "BLE mode" to place the game controller 102 in BLE mode, or the player 120 may utter "receiver mode" to place the game controller 102 in receiver mode.

The processes described herein are illustrated as a collection of blocks in a logical flow graph, which represent a sequence of operations that can be implemented in hardware, software, firmware, or a combination thereof (referred to herein as "logic"). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
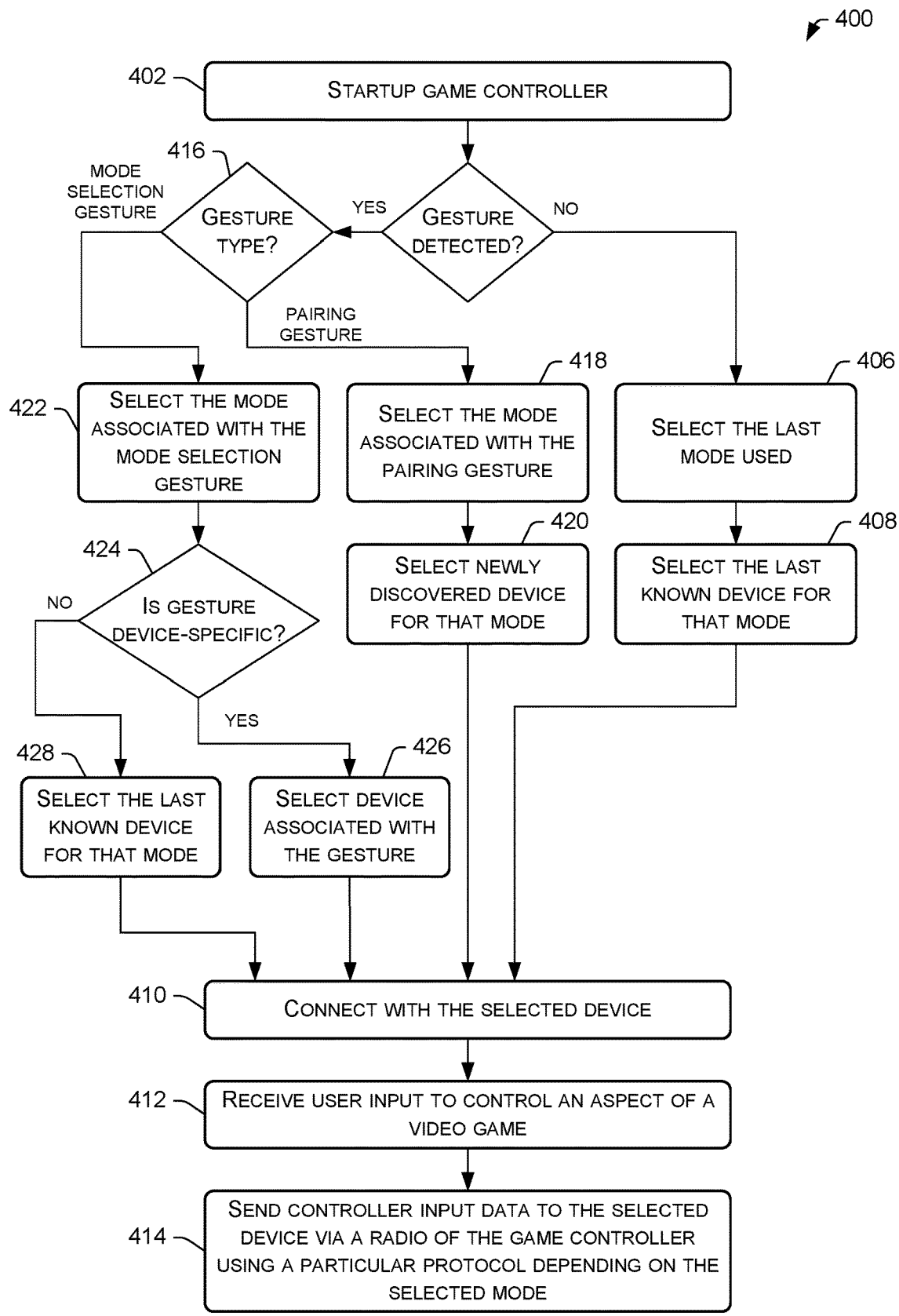
FIG. 4 is a flow diagram of an example process for operating a handheld video game controller in one of multiple modes of operation.

FIG. 4 is a flow diagram of an example process 400 for operating a handheld video game controller 102 in one of multiple modes of operation. For discussion purposes, the process 400 is described with reference to the previous figures.

At 402, the game controller 102 may startup by transitioning from a power off state to a power on state. In the power on state, power is supplied from a power source (e.g., one or more batteries) to one or more electrical components of the game controller 102. Starting up the game controller 102 at block 402 may be based on (e.g., responsive to) the game controller 102 receiving first user input. For example, a power button, such as the guide button 304 shown in FIG. 3, may be pressed to start up (power on or boot up) the game controller 102.

At 404, logic of the game controller 102 may determine whether the first user input received at block 402 comprises a gesture, such as a predefined gesture stored in memory 224 of the game controller 102. If, at block 404, it is determined that the first user input received at block 402 does not comprise a gesture (e.g., the player 120 may have merely pressed a power button, such as the guide button 304, to power on the game controller 102), the process 400 may follow the "NO" route from block 404 to block 406.

At 406, the logic of the game controller 102 may determine to operate the game controller 102 in a particular mode of operation, among multiple modes of operation, in which the game controller 102 was last operated. For example, the multiple modes of operation may include a BLE mode and a receiver mode, as described herein. At block 406, the logic of the game controller 102 may consult the data maintained by the operating mode component 238 to determine which of these modes was last (most recently) used to operate the game controller 102 before receiving the first user input at block 402 to startup the game controller 102. If the BLE mode is identified as the last mode in which the game controller 102 operated, the BLE mode is selected at block 406. If the receiver mode is identified as the last mode in which the game controller 102 operated, the receiver mode is selected at block 406.

At 408, the logic of the game controller 102 may determine a device (e.g., a BLE device or a wireless receiver) to which the game controller 102 has previously connected. Specifically, at block 408, the logic may identify, based at least in part on data stored in memory 224 (e.g., from the device-record database 232) of the game controller 102, a device to which the handheld video game controller was last connected before receiving the first user input at block 402 to startup the game controller 102. These devices stored in memory 224 of the game controller 102 may be associated with a particular mode of operation (e.g., at least one of the BLE mode or the wireless receiver mode). This may be used as a filtering criterion for selecting a device at block 408. That is, if the BLE mode was selected as the last mode used at block 406, a most recently connected BLE device 114 may be identified and selected at block 408. If, on the other hand, the receiver mode was selected as the last mode used at block 406, a most recently connected wireless receiver 118 may be identified and selected at block 408.

At 410, with the mode of operation and the device selected, the game controller 102 may establish a wireless connection with the selected device via a radio of the game controller 102 using an appropriate protocol. For example, if operating in the BLE mode, the game controller 102 may establish the wireless connection with a BLE device 114 executing a client application 252 via the radio of the game controller 102 using BLE protocol. If operating in the receiver mode, however, the game controller 102 may establish the wireless connection with a wireless receiver 118 via the radio of the game controller 102 using a non-BLE protocol (e.g., WiFi). Establishing a wireless connection may comprise establishing a radio link (e.g., authenticating, handshaking, etc.) over which data can be sent. This may involve identifying a radio signal (and possibly a strength of the radio signal) of the device.

At 412, the game controller 102 may receive second user input to control an aspect of a video game executing on a host computer (e.g., the client machine 106) different from the device with which the game controller 102 connected at block 410, such as a BLE device 114 or a wireless receiver 118. For example, the client machine 106 may be executing a video game 212, streaming video game data 122 to a target device. If operating in the BLE mode, the target device may be the BLE device 114 with which the game controller 102 connected at block 410. If operating in the receiver mode, the target device may be a device (e.g., the television 116) connected to the wireless receiver 118 with which the game controller 102 connected at block 410. The player 120 may be playing the video game by providing user input to the game controller 102 (e.g., operating the controls on the game controller 102, moving the game controller 102, as detected by motion sensors, etc.).

At 414, the game controller 102 may send controller input data 124 to the device with which the game controller 102 connected at block 410. Again, depending on the mode of operation, the receiving device of the controller input data 124 may be a BLE device 114 or a wireless receiver 118. In the case of operating in the BLE mode, the controller input data 124 may be sent to the BLE device 114 via the radio of the game controller 102 using BLE protocol. In the case of operating in the receiver mode, the controller input data 124 may be sent to the wireless receiver 118 via the radio of the game controller 102 using a non-BLE protocol (e.g., WiFi). The controller input data 124 may be based on the user input received at block 412, and may be packaged in any suitable format.

In some embodiments, when operating in BLE mode, the logic of the game controller 102 may use custom BLE characteristics to generate the controller input data 124 so that it may be received by the client application 252 executing on the BLE device 114. This may involve a BLE profile interfacing with a GATT layer in the BLE protocol stack for communicating characteristics in the controller input data 124.

Returning with reference to block 404, if it is determined that the first user input received at block 402 comprise a gesture (e.g., a multi-button gesture, as described with reference to FIG. 3), the process 400 may follow the "YES" route from block 404 to block 416.

At 416, the logic of the game controller 102 may determine the type of gesture detected. For example, the memory 224 of the game controller 102 may store a plurality of predefined gestures, such as the gestures 302(1)-(4) described with reference to FIG. 3. These example gestures 302 can be categorized into pairing gestures (e.g., gestures 302(1) and 302(3) are pairing gestures) and mode selection gestures (E.g., gestures 302(2) and 302(4) are mode selection gestures). If, at block 416, the gesture is determined as a pairing gesture, the process 400 may proceed from block 416 to block 418 where the logic of the game controller 102 determines to operate the game controller 102 in a particular mode associated with the pairing gesture. For example, if the gesture is the pairing gesture 302(1) of FIG. 3, the logic may determine to operate in BLE mode, whereas, if the gesture is the pairing gesture 302(3) of FIG. 3, the logic may determine to operate in receiver mode.

At 420, based on the mode of operation that is selected at block 418, the logic of the game controller 102 may determine a new device for that mode with which the game controller has not yet connected (i.e., a new device). For the BLE mode, this may be a new BLE device 114 that is put into BLE pairing mode through the client app 252 executing on the BLE device 114. For the receiver mode, this may be a new wireless receiver 118 that is put into a receiver pairing mode, as described herein.

With a new device identified and selected at block 420, the blocks 410-414 may be performed, as described above, but with respect to the newly identified device. That is, the game controller 102 may establish a wireless connection with the new device (block 410), receive (second) user input to control an aspect of a video game executing on a host computer (block 412), and send controller input data 124 to the connected device over the radio using an appropriate protocol based on the (second) user input (block 414).

Returning with reference to block 416, if the gesture is determined as a mode selection gesture, the process 400 may proceed from block 416 to block 422 where the logic of the game controller 102 determines to operate the game controller 102 in a particular mode associated with the mode selection gesture. For example, if the gesture is the mode selection gesture 302(2) of FIG. 3, the logic may determine to operate in BLE mode, whereas, if the gesture is the mode selection gesture 302(4) of FIG. 3, the logic may determine to operate in receiver mode.

At 424, the logic of the game controller 102 may determine whether the gesture is associated with a particular device among multiple devices to which the game controller 102 has previously connected. For example, data stored in memory 224 of the game controller 102 (e.g., the device-record database 232) may maintain a list of devices to which the game controller 102 has previously connected. These devices may be filtered based on the mode of operation selected at block 422. If the gesture is specific to one of the devices associated with the selected mode of operation, the process 400 may follow the "YES" route from block 424 to block 426, where the device associated with the gesture may be selected. For example, the player 120 may provide one gesture (e.g., the B button 300(4) and the guide button 304) to connect to the most recently used BLE device in the device-record database 232, and another gesture (e.g., a start button and the guide button 304) to connect to a next recently used BLE device in the device-record database 232. Depending on which one of these gestures is detected, the device associated with that gesture may be selected as the identified device at block 426. Similar logic applies to the receiver mode, as described herein.

At block 424, if the gesture is not device-specific (e.g., the gesture is not specific to one of the devices associated with the selected mode of operation), the process 400 may follow the "NO" route from block 424 to block 428, where the logic selects the device to which the game controller 102 was last connected before receiving the first user input at block 402 to startup the game controller 102. That is, the most recently connected device may be selected at block 428 if the gesture is not otherwise a device-specific gesture. In BLE mode, this device is the BLE device 114 to which the game controller 102 was last connected before receiving the first user input at block 402 to startup the game controller 102. In receiver mode, this device is the wireless receiver 118 to which the game controller 102 was last connected before receiving the first user input at block 402 to startup the game controller 102.

Following either block 428 or block 426, the blocks 410-414 may be performed, as described above, but with respect to the device identified and selected at block 428 or block 426. That is, the game controller 102 may establish a wireless connection with the selected device (block 410), receive (second) user input to control an aspect of a video game executing on a host computer (block 412), and send controller input data 124 to the connected device over the radio using an appropriate protocol based on the (second) user input (block 414).

Figure 5:
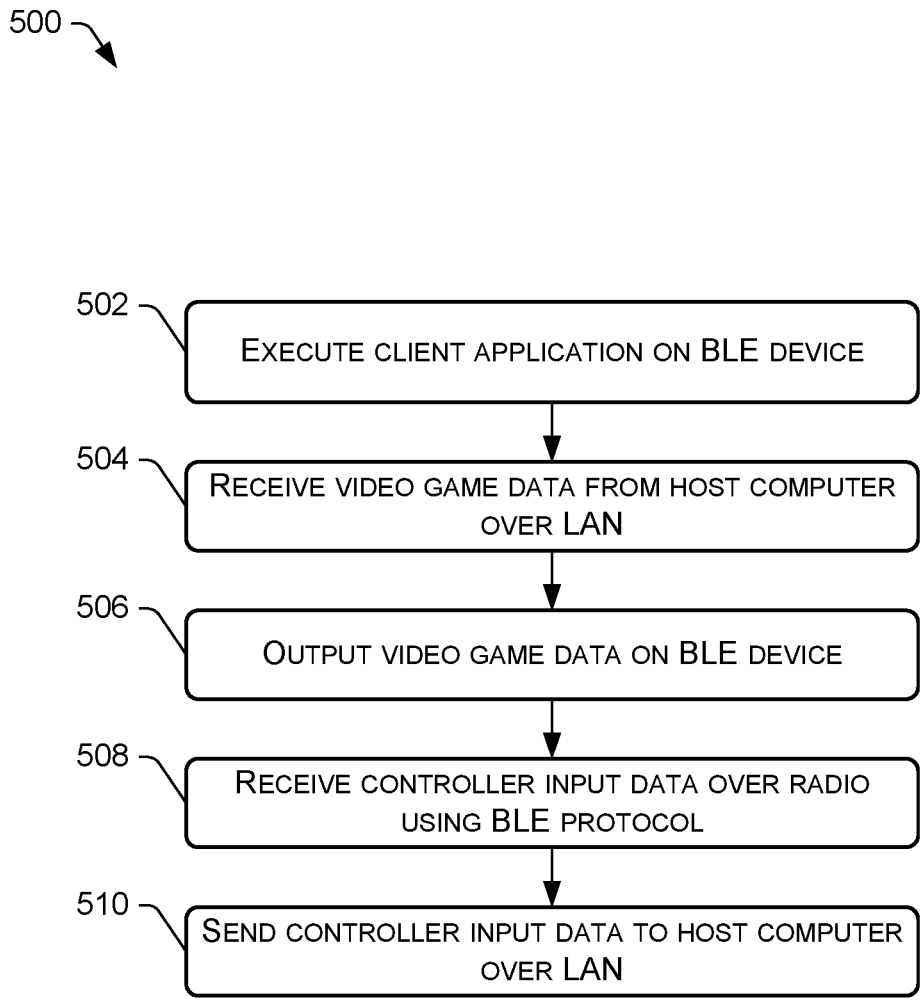
FIG. 5 is a flow diagram of an example process for operating a BLE device to stream a video game executing on a host computer and to receive controller input data over BLE from a game controller.

FIG. 5 is a flow diagram of an example process 500 for operating a BLE device 114 to stream a video game executing on a host computer and to receive controller input data over BLE from a game controller 102. For discussion purposes, the process 500 is described with reference to the previous figures.

At 502, the BLE device 114 (which is connected to a LAN of an environment 112) may execute a client app 252. This client app 252 may configure the BLE device 114 to function as a target device for video game streaming, and also to function as a hub device for controller input data provided by a connected game controller 102 (e.g., connected over BLE).

At 504, during execution of a video game 212 on a host computer (e.g., the client machine 106 collocated in the environment 112 with the BLE device 114), the BLE device 114 may receive video game data 122 streamed from a host computer (e.g., the client machine 106) over a LAN (e.g., via the WAP 110).

At 506, the BLE device 114 may outputs audio and video data (e.g., the video game data 122 comprising the audio and video data) via an output device(s) (e.g., display(s) 244 and speaker(s)) of the BLE device 114.

At 508, the BLE device 114—functioning as a hub device—may receive controller input data 124 from a connected game controller 102 over a radio of the BLE device 114 using BLE protocol. The custom BLE characteristics available via the client app 252 may allow for receiving the controller input data in a manner that bypasses any OS restrictions on game controller input.

At 510, the BLE device 114 may send the controller input data 124 it received from the game controller 102 to the host computer (e.g., the client machine 106) executing the video game 212. The controller input data 124 may be sent from the BLE device 114 over the LAN (e.g., via the WAP 110) to the host computer.

Figure 6:
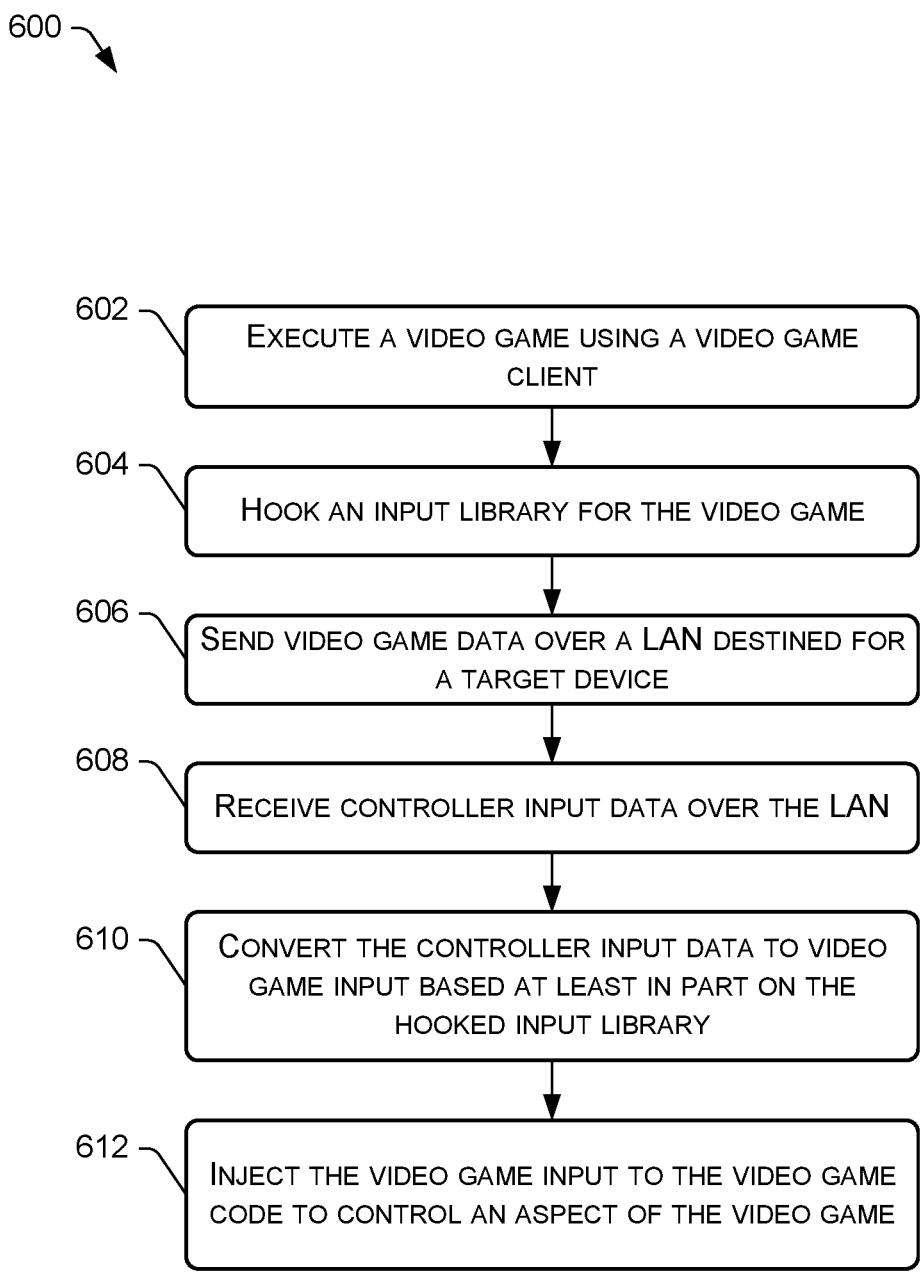
FIG. 6 is a flow diagram of an example process for operating a host computer to stream a video game executing thereon to a target device while receiving controller input data from a game controller that is separate from the host computer.

FIG. 6 is a flow diagram of an example process 600 for operating a host computer to stream a video game executing thereon to a target device while receiving controller input data from a game controller that is separate from the host computer. For discussion purposes, the process 600 is described with reference to the previous figures.

At 602, a host computer (e.g., the client machine 106, the remote system 104, etc.) may execute a video game 212 using a video game client 210. The video game client 210 may be configured to allow a player 120 to play the video game on the host computer itself, and/or allow for streaming of the video game 212 to a target device (e.g., via the streaming component 216).

At 604, the video game client 210 may hook the input library (or input libraries) of the video game 212 that is executing on the host computer to determine how to convert controller input data 124 into data that is usable by the video game 212. This allows the video game client 210 to intercept function calls from the video game 212 code to read game controller state, and to return a controller state that the video game 212 is expecting to see, which may involve remapping the state of a connected game controller 102 to a different type of game controller state.

At 606, the host computer may send video game data 122 captured by the video game client 210 over a LAN to a target device. Depending on the mode of operation of the game controller 102, as described herein, this may involve sending the video game data 122 to a BLE device 114 while in BLE mode, or to a wireless receiver 118 while in receiver mode (the wireless receiver 118 connected to, or embedded in, a target device. The video game data 122 may include audio and video data, and this data may be encoded for transmission over the LAN, as described herein.

At 608, the host computer may receive controller input data 124 over the LAN from a sending device. Again, depending on the mode of operation of the game controller 102, the sending device of the controller input data 124 may be a BLE device 114 while in BLE mode, or a wireless receiver 118 while in receiver mode.

At 610, the video game client 210 may convert the controller input data 124 into video game input that the video game 212 code can understand/process. This conversion at block 610 may be based at least in part on the hooked input library for the video game. The conversion at block 610 may be based on other factors as well, such as the player's 120 preferences known to the video game client 210 regarding how the player 120 would prefer controller input data 124 to be converted. In some embodiments, the conversion at block 610 may involve remapping the controller input data 124 into appropriate video game input that can be injected into the video game 212 code. In some embodiments, video game developers may utilize API that allows them to specify game controller configurations that remap (or otherwise convert) controller input data 124 from various types of controllers into suitable video game input for their video game. Thus, the video game client 210 may utilize such game controller configurations for remapping at block 610. The video game client 210 may also translate between different types of game controllers, such as controllers on the market from various game controller makers, and possibly between mouse and keyboard input.

At 612, the video game client 210 may "inject" the video game input (converted from the controller input data 124) into the video game 212 code to control an aspect of the video game 212 executing on the host computer. For example, video game input causing a player-controlled character to jump may cause the player-controlled character to jump over the course of the next several frames that are streamed to the target device.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A handheld controller comprising:
   a processor;
   a radio; and
   memory storing computer-executable instructions that, when executed by the processor, cause the handheld controller to:
   determine that user input received by the handheld controller comprises a gesture;
   determine that the gesture is a mode selection gesture associated with an operating mode among multiple operating modes of the handheld controller, wherein the operating mode is associated with a second wireless protocol; and
   based at least in part on determining that the gesture is the mode selection gesture associated with the operating mode:
   switch from utilizing a first wireless protocol to utilizing the second wireless protocol, wherein the first wireless protocol is different than the second wireless protocol; and
   send, using the radio, controller input data to a device configured to utilize the second wireless protocol.

2. The handheld controller of claim 1, wherein the computer-executable instructions, when executed by the processor, further cause the handheld controller to:
   filter a list of devices to which the handheld controller has previously connected based at least in part on the operating mode to obtain a filtered list of devices associated with the operating mode;
   select the device from the filtered list of devices; and
   establish a wireless connection with the device prior to sending the controller input data to the device.

3. The handheld controller of claim 1, wherein:
   determining that the gesture is the mode selection gesture associated with the operating mode comprises determining that the gesture is a first mode selection gesture of a plurality of mode selection gestures; and
   the plurality of mode selection gestures include at least the first mode selection gesture and a second mode selection gesture associated with a second operating mode among the multiple operating modes.

4. The handheld controller of claim 1, wherein the gesture comprises at least one of:
   a swipe gesture detected by a touch sensor of the handheld controller;
   a voice gesture detected by a microphone of the handheld controller: or
   a multi-button gesture detected by the handheld controller as a press of a combination of multiple buttons of the handheld controller.

5. The handheld controller of claim 1, wherein the computer-executable instructions, when executed by the processor, further cause the handheld controller to:
   determine that second user input received by the handheld controller comprises a second gesture;
   determine that the second gesture is a second mode selection gesture associated with a second operating mode among the multiple operating modes, wherein the second operating mode is associated with the first wireless protocol; and
   based at least in part on determining that the second gesture is the second mode selection gesture associated with the second operating mode, send, using the radio, second controller input data to a second device configured to utilize the first wireless protocol.

6. The handheld controller of claim 1, wherein:
the operating mode comprises a Bluetooth Low Energy (BLE) mode; and
the second wireless protocol comprises a BLE protocol.

7. The handheld controller of claim 1, wherein the handheld controller is a game controller configured to control an aspect of a video game.

8. A method comprising:
determining, by a handheld controller, that user input received by the handheld controller comprises a gesture;
determining, by the handheld controller, that the gesture is a mode selection gesture associated with an operating mode among multiple operating modes of the handheld controller, wherein the operating mode is associated with a second wireless protocol; and
based at least in part on the determining that the gesture is the mode selection gesture associated with the operating mode:
switching, by the handheld controller, from utilizing a first wireless protocol to utilizing the second wireless protocol, wherein the first wireless protocol is different than the second wireless protocol; and
sending, by the handheld controller and using a radio of the handheld controller, controller input data to a device configured to utilize the second wireless protocol.

9. The method of claim 8, further comprising:
determining, by the handheld controller, that the gesture is a device-specific gesture;
selecting, by the handheld controller, the device based at least in part on an association of the device with the device-specific gesture; and
establishing, by the handheld controller, a wireless connection with the device prior to the sending of the controller input data to the device.

10. The method of claim 8, further comprising:
determining, by the handheld controller, that the gesture is not a device-specific gesture;
selecting, by the handheld controller, the device based at least in part on the handheld controller having been last connected to the device before receiving the user input; and
establishing, by the handheld controller, a wireless connection with the device prior to the sending of the controller input data to the device.

11. The method of claim 8, wherein:
the determining that the gesture is the mode selection gesture associated with the operating mode comprises determining that the gesture is a first mode selection gesture of a plurality of mode selection gestures; and
the plurality of mode selection gestures include at least the first mode selection gesture and a second mode selection gesture associated with a second operating mode among the multiple operating modes.

12. The method of claim 8, wherein the gesture comprises at least one of:
a swipe gesture detected by a touch sensor of the handheld controller,
a voice gesture detected by a microphone of the handheld controller; or
a multi-button gesture detected by the handheld controller as a press of a combination of multiple buttons of the handheld controller.

13. The method of claim 8, further comprising:
determining, by the handheld controller, that second user input received by the handheld controller comprises a second gesture;
determining, by the handheld controller, that the second gesture is a second mode selection gesture associated with a second operating mode among the multiple operating modes, wherein the second operating mode is associated with the first wireless protocol; and
based at least in part on the determining that the second gesture is the second mode selection gesture associated with the second operating mode, sending, by the handheld controller and using the radio, second controller input data to a second device configured to utilize the first wireless protocol.

14. The method of claim 8, wherein:
the operating mode comprises a Bluetooth Low Energy (BLE) mode; and
the second wireless protocol comprises a BLE protocol.

15. A method comprising:
determining, by a handheld controller, that user input received by the handheld controller comprises a gesture;
determining, by the handheld controller, that the gesture is a pairing gesture associated with an operating mode among multiple operating modes of the handheld controller, wherein the operating mode is associated with a second wireless protocol; and
based at least in part on the determining that the gesture is the pairing gesture associated with the operating mode:
switching, by the handheld controller, from utilizing a first wireless protocol to utilizing the second wireless protocol, wherein the first wireless protocol is different than the second wireless protocol; and
sending, by the handheld controller and using a radio of the handheld controller, controller input data to a device configured to utilize the second wireless protocol.

16. The method of claim 15, wherein:
the determining that the gesture is the pairing gesture associated with the operating mode comprises determining that the gesture is a first pairing gesture of a plurality of pairing gestures; and
the plurality of pairing gestures include at least the first pairing gesture and a second pairing gesture associated with a second operating mode among the multiple operating modes.

17. The method of claim 15, further comprising:
identifying, by the handheld controller, the device based at least in part on the device having been placed into a pairing mode associated with the second wireless protocol; and
establishing, by the handheld controller, a wireless connection with the device prior to the sending of the controller input data to the device.

18. The method of claim 15, further comprising:
determining, by the handheld controller, that second user input received by the handheld controller comprises a second gesture;
determining, by the handheld controller, that the second gesture is a second pairing gesture associated with a second operating mode among the multiple operating modes, wherein the second operating mode is associated with the first wireless protocol; and
based at least in part on the determining that the second gesture is the second pairing gesture associated with the second operating mode, sending, by the handheld controller and using the radio, second controller input data to a second device configured to utilize the first wireless protocol.

19. The method of claim 15, wherein the handheld controller is a game controller configured to control an aspect of a video game.

20. The method of claim 15, wherein:
the operating mode comprises a Bluetooth Low Energy (BLE) mode; and
the second wireless protocol comprises a BLE protocol.

* * * * *